United States Patent [19]

Furuya et al.

[11] Patent Number: 4,889,204
[45] Date of Patent: Dec. 26, 1989

[54] DRIVE FORCE DISTRIBUTION CONTROL SYSTEM FOR FOUR-WHEEL DRIVE MOTOR VEHICLE

[75] Inventors: Kunitaka Furuya; Yasuji Shibahata, both of Tochigi, Japan

[73] Assignee: Honda Giken Kogyo Kabushiki Kaisha, Tokyo, Japan

[21] Appl. No.: 259,680

[22] Filed: Oct. 19, 1988

[30] Foreign Application Priority Data

Oct. 20, 1987 [JP] Japan .................................. 62-264675

[51] Int. Cl.$^4$ ............................................. B60K 17/34
[52] U.S. Cl. ..................................... 180/197; 180/248
[58] Field of Search ............... 180/197, 248, 247, 233, 180/244; 364/424.1

[56] References Cited

U.S. PATENT DOCUMENTS

| | | | |
|---|---|---|---|
| 4,712,635 | 12/1987 | Sumiy et al. | 180/197 |
| 4,733,760 | 3/1988 | Inagaki et al. | 180/197 |
| 4,757,870 | 7/1988 | Torii et al. | 180/247 |

FOREIGN PATENT DOCUMENTS

| | | |
|---|---|---|
| 62-6831 | 1/1987 | Japan . |
| 62-203030 | 9/1987 | Japan . |

Primary Examiner—Charles A. Marmor
Assistant Examiner—Donn McGiehan
Attorney, Agent, or Firm—Armstrong, Nikaido, Marmelstein, Kubovcik & Murray

[57] ABSTRACT

A drive force distribution control system in a four-wheel drive motor vehicle for distributing drive forces from an engine of the motor vehicle to first and second wheels of the motor vehicle includes drive force distributing means for distributing and transmitting the drive forces to the first and second wheels, first speed detecting means for detecting a rotational speed (Nf) of the first wheel, second speed detecting means for detecting a rotational speed (Nr) of the second wheel, torque detecting means for detecting a torque (Tr) transmitted to the second wheel, and control means for controlling the drive force distributing means. The control means for calculating a slip ratio (S) of the second wheel to a road on which the motor vehicle is running based on the rotational speeds of the first and second wheels, calculating a ratio (Tr/S) between the torque (Tr) and the slip ratio (S), determining a distribution ratio between the drive forces to be distributed to the first and second wheels based on the ratio between the torque and the slip ratio, and controlling the drive force distributing means to distribute and transmit the drive forces to the first and second wheels according to the distribution ratio.

15 Claims, 2 Drawing Sheets

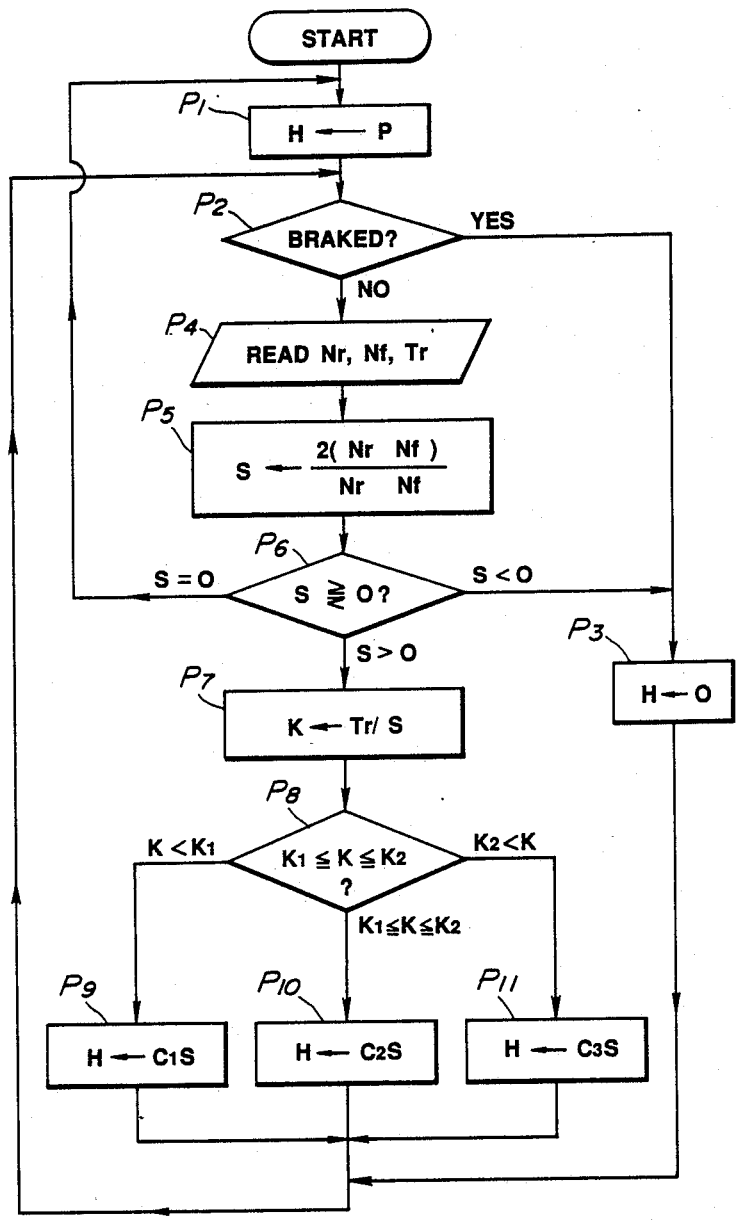

DRIVE FORCE DISTRIBUTION CONTROL SYSTEM FOR FOUR-WHEEL DRIVE MOTOR VEHICLE

BACKGROUND OF THE INVENTION

1. Field of the Invention

The present invention relates to a drive force distribution control system for use with a four-wheel drive motor vehicle, and more particularly to a drive force distribution control system for use with a four-wheel drive motor vehicle, for determining a ratio between drive forces to be distributed to front and rear wheels based on both the drive force transmitted to one of the front and rear wheels and the slip ratio between said one wheel and the road surface on which the motor vehicle is running.

2. Description of the Relevant Art

Four-wheel drive motor vehicles in which both front and rear wheels are drivable generally have a transfer clutch for distributing and transmitting engine power to the front and rear wheels to enable them to exert drive forces for propelling the motor vehicle.

As disclosed in Japanese Laid-Open Patent Publication No. 62-6831 (published: Jan. 13, 1987), one recent four-wheel drive motor vehicle employs, as such a transfer clutch, a differential mechanism or a hydraulic multiple-plate clutch having a limited-slip differential function. The slip ratio between the front and rear wheels based on a reference rotational speed of one of the front and rear wheels is calculated according to a certain formula, and a ratio between drive forces to be distributed to the front and rear wheels is determined on the basis of the calculated slip ratio. The drive forces are then distributed to the front and rear wheels based on the determined distribution ratio. By thus controlling the drive force distribution, the steering characteristics of the motor vehicle can be stabilized to prevent the motor vehicle from excessively understeering during high-speed travel without lowering starting and accelerating capabilities of the motor vehicle.

It is known in general that a four-wheel drive motor vehicle tends to understeer by selecting a drive power distribution ratio such that the drive force distributed to rear wheels is smaller than the drive force distributed to front wheels. It is also known that the four-wheel drive motor vehicle has an oversteering tendency when running on a road having a low coefficient of friction with respect to vehicle road wheels because of low friction between the wheels (or their tires) and the road. Therefore, it is considered to be possible to prevent the four-wheel drive motor vehicle from oversteering and to give the motor vehicle good maneuvering stability by distributing a smaller drive power to the rear wheels when the motor vehicle is running on a road having a low coefficient of friction. However, it is difficult to directly and accurately measure the condition of the road on which an automobile is running in order to detect the coefficient of friction between the road wheels and the road. There has recently been proposed to employ an ultrasonic sensor or the like for indirectly measuring the road condition for the control of the drive force distribution. The ultrasonic sensor is however expensive and unreliable as it cannot accurately detect the coefficient of friction.

SUMMARY OF THE INVENTION

In view of the aforesaid drawbacks of the conventional drive force distribution systems for four-wheel drive motor vehicles, it is an object of the present invention to provide a drive force distribution control system for use with a four-wheel drive motor vehicle, which operates by accurately detecting and analyzing running conditions of the four-wheel drive motor vehicle, including a braked condition, and a coefficient of friction or frictional contact between wheels of the motor vehicle and a road on which the motor vehicle is running, determining an optimum distribution ratio between drive forces to be distributed to the front and rear wheels under the detected running conditions, and distributing and transmitting the drive forces to the front and rear wheels based on the determined distribution ratio.

According to the present invention, there is provided a drive force distribution control system in a four-wheel drive motor vehicle for distributing drive forces from an engine of the motor vehicle to first and second wheels of the motor vehicle, comprising drive force distributing means for distributing and transmitting the drive forces to the first and second wheels, first speed detecting means for detecting a rotational speed (Nf) of the first wheel, second speed detecting means for detecting a rotational speed (Nr) of the second wheel, torque detecting means for detecting a torque (Tr) transmitted to the second wheel, and control means for calculating a slip ratio (S) of the second wheel to a road on which the motor vehicle is running based on the rotational speeds of the first and second wheels, calculating a ratio (Tr/S) between the torque (Tr) and the slip ratio (S), determining a distribution ratio between the drive forces to be distributed to the first and second wheels based on the ratio between the torque and the slip ratio, and controlling the drive force distributing means to distribute and transmit the drive forces to the first and second wheels according to the distribution ratio.

The ratio (Tr/S) between the torque and the slip ratio is a value dependent on a coefficient of friction between the wheels and the road, and, with the first wheel being a front wheel, the control means determines the distribution ratio to distribute and transmit a greater drive force to the first wheel if said ratio (Tr/S) is smaller than a threshold value representative of a relatively small coefficient of friction.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is a flowchart of an operation sequence of the drive force distribution control system.

DETAILED DESCRIPTION OF THE PREFERRED EMBODIMENT

Figure 1:
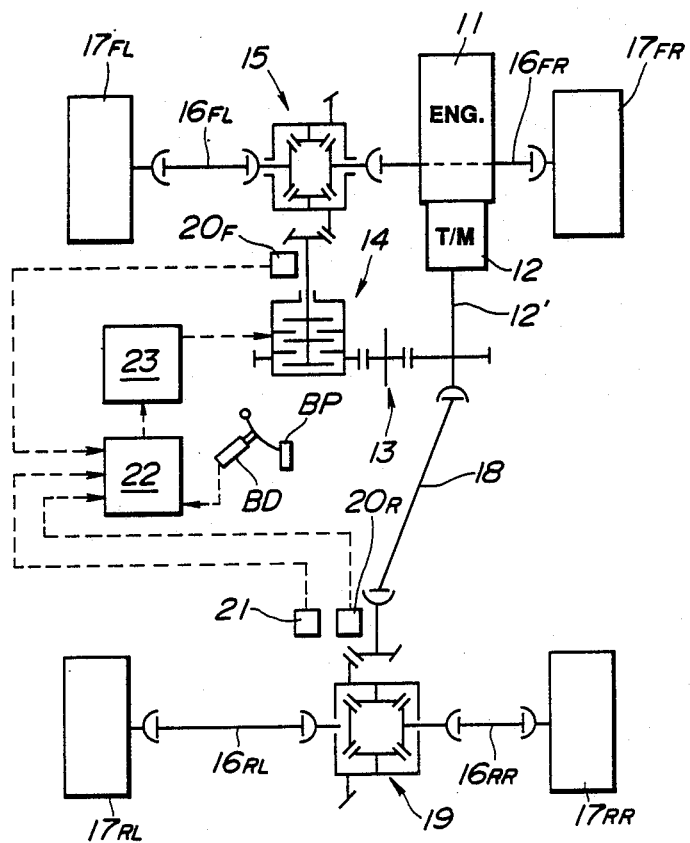
FIG. 1 is a schematic plan view of a four-wheel drive motor vehicle incorporating a drive force distribution control system according to an embodiment of the present invention.

FIG. 1 schematically shows a four-wheel drive motor vehicle incorporating therein drive force distribution control system in accordance with the present invention.

As shown in FIG. 1, the four-wheel drive motor vehicle has an engine 11 and a transmission 12 unitarily coupled thereto, the engine 11 and the transmission 12 jointly constituting a drive source unit. The transmission 12 has an output shaft 12' from which drive forces are transmitted to a pair of front wheels 17FL, 17FR through a front wheel drive system comprising a parallel-gear mechanism 13, a hydraulic multiple-plate clutch 14, a front wheel differential 15, and axles 16FL, 16FR, and also to a pair of rear wheels 17RL, 17RR through a rear wheel drive system comprising a propeller shaft 18, a rear wheel differential 19, and axles 16RL, 16RR. The front wheels will hereinafter be referred to collectively as front wheels 17F, and the rear wheels will hereinafter be referred to collectively as rear wheels 17R.

A front wheel rotational speed sensor 20F is disposed near the input shaft of the front wheel differential 15, and a rear wheel rotational speed sensor 20R and a torque sensor 21 are disposed near the input shaft of the rear wheel differential 19. The rotational speed sensors 20F, 20R and the torque sensor 21 are electrically connected to a control unit 22. The front and rear wheel rotational speed sensors 20F, 20R comprise known reed switches or the like for producing pulsed signals having frequencies proportional to the speeds of rotation of the front and rear wheels 17F, 17R, respectively. The torque sensor 21 comprises a magnetostrictive torque sensor as disclosed in Japanese Laid-Open Patent Publication No. 62-203030 (published: Sept. 7, 1987), for example, and produces a signal representative of a transmitted torque, i.e., the drive force applied to the rear wheels 17R.

The control unit or control means 22 comprises a microcomputer for processing output signals from the respective sensors 20F, 20R, 21 to control a pressure control valve 28 (described later on).

The hydraulic multiple-plate clutch 14 has an oil chamber connected to a hydraulic pressure control circuit 23. The hydraulic multiple-plate clutch 14 can vary the torque transmitted from the drive source unit to the front wheel differential 15 or the front wheels 17F dependent on the oil pressure supplied from the hydraulic pressure control circuit 23 to the oil chamber of the clutch 14.

Figure 2:
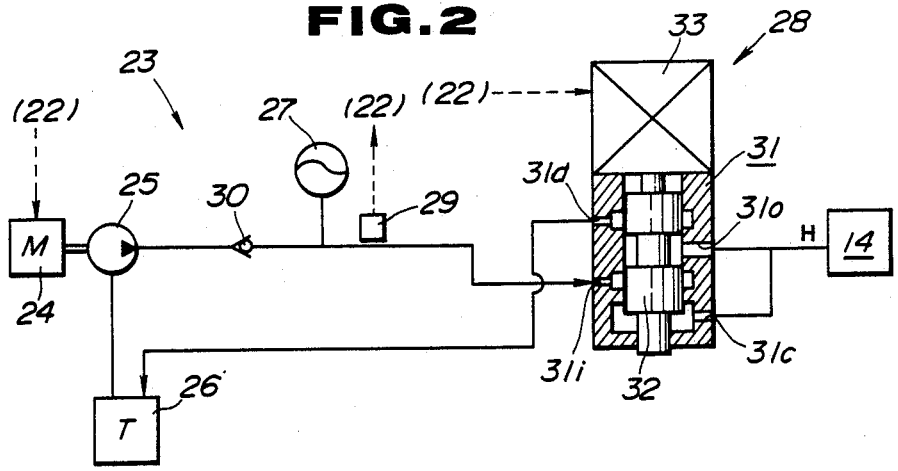
FIG. 2 is a circuit diagram of a hydraulic control circuit employed in the drive force distribution control system.

As schematically illustrated in FIG. 2, the hydraulic pressure control circuit 23 includes a pump 25 driven by a motor 24 for discharging oil under pressure from a reservoir tank 26, an accumulator 27 for storing the oil pressure discharged by the pump 25, and a solenoid-operated pressure control valve 28 with a central closed position for supplying the oil pressure to the hydraulic multiple-plate clutch 14. The motor 24 is electrically connected to the control unit 22. The accumulator 27 is associated with a pressure sensor 29 electrically connected to the control unit 22. The motor 24 is energized when the oil pressure as detected by the pressure sensor 29 drops below a predetermined pressure level. A one-way valve 30 is connected between the pump 25 and the accumulator 27 for allowing an oil flow only from the pump 25 to the accumulator 27.

The pressure control valve 28 includes a valve body or casing 31 having an inlet port 31i connected to the accumulator 27, a drain port 31d connected to the reservoir tank 26, an outlet port 31o and a control port 31c which are coupled to the oil chamber of the hydraulic multiple-plate clutch 14. The pressure control valve 28 also has a spool 32 axially slidably disposed in the valve casing 31 connected to a solenoid 33 electrically joined to the control unit 22. The oil pressure supplied from the outlet port 31o to the hydraulic multiple-plate clutch 14 is controlled linearly according to an electric current flowing through the solenoid 33. The pressure control valve 28, while allowing the oil pressure drawn from the oil chamber of the clutch 14 via the control port 31c and the biasing force of the solenoid 33 to act on the spool 32 in opposite axial directions, maintains the oil pressure supplied to the oil chamber of the clutch 14 at a pressure level corresponding to the value of an electric current flowing through the solenoid 33.

The hydraulic pressure control circuit 23 and the hydraulic multiple-plate clutch 14 jointly constitute a drive force distributing means which is controlled to distribute and transmit drive forces from the drive source unit to the front and rear wheels 17F, 17R based on a distribution ratio determined by the control unit or control means 22.

Operation of the drive force distribution control system of the invention will be described with reference to the flowchart of FIG. 3.

By repeatedly executing the operation sequence of FIG. 3 with the microcomputer of the control unit 22, the drive force distribution control system controls oil pressure H supplied to the hydraulic multiple-plate clutch 14 for optimally distributing the drive forces from the drive source unit to the front and rear wheels 17F, 17R.

When an ignition key is turned on, the oil pressure H is set to a relatively high initial level P in a step P1 which is large enough to keep the hydraulic multiple-plate clutch 14 engaged.

The drive forces from the output shaft 12' of the drive source unit are divided and transmitted to the front wheel drive system by the parallel-gear mechanism 13, as described above. With the hydraulic multiple-plate clutch 14 engaged ideally, it is possible to distribute final drive forces to the front and rear wheels 17F, 17R at any desired ratio by adjusting or modifying the parallel-gear mechanism 13 and the front and rear wheel drive systems. In the illustrated embodiment, when the hydraulic multiple-plate clutch 14 is engaged under idea conditions, the ratio between final drive forces to be distributed to the front and rear wheels 17F, 17R is selected in advance to be substantially fifty-fifty. By applying the oil pressure P to the clutch 14 to engage the same under such conditions in the step P1, the drive forces are transmitted to the front and rear wheels 17F, 17R at the substantially fifty-fifty distribution ratio to start the motor vehicle quickly in a four-wheel drive mode.

A next step P2 determines whether the motor vehicle is braked by depressing a brake pedal BP based on a signal from a braking detector BD associated with the brake pedal BP. If the motor vehicle is braked, then the oil pressure H is reduced to zero in a step P3 to drive the motor vehicle in a rear-wheel drive mode for stabilizing the braked condition. The braked condition of the motor vehicle may be detected by some other means than the braking detector BD. When the motor vehicle is braked, the oil pressure H may not necessarily be eliminated insofar as at least the relative torque transmission between the front and rear wheels 17F, 17R can be reduced.

If the motor vehicle is not braked, control proceeds from the step P2 to a step P4.

In the step P4, a front wheel rotational speed Nf, a rear wheel rotational speed Nr, and a transmitted torque Tr are read from output signals produced by the rotational speed sensors 20F, 20R and the torque sensor 21. Then, the difference between the speeds of rotation of the rear and front wheels 17R, 17F is divided by the speed of the motor vehicle, i.e., the difference between the front and rear wheel rotational speeds is divided by the mean value of the front and rear wheel rotational speeds to find a slip ratio S according to the following equation (1) in a step P5:

$$S = 2(Nr - Nf)/(Nr + Nf) \quad (1)$$

Then, the value of the slip ratio S is checked in a step P6. If the slip ratio S is zero, then control returns back to the step P1. If the slip ratio S is negative, then control jumps to the step P3. Where the motor vehicle is at rest and hence the slip ratio S is zero or substantially zero, since the oil pressure H is set to the relatively large level P, as described above, the motor vehicle can be started quickly without slippage in the four-wheel drive mode. Where the motor vehicle is making a turn and the slip ratio S is negative, the oil pressure H is reduced to zero, and the phenomenon of tight-turn braking is prevented. If the slip ratio S is positive in the step P6, then control goes to a step P7. When the slip ratio S is positive, the rear wheels 17R are idly rotating with respect to the road at the slip ratio S.

In the step P7, the transmitted torque Tr is divided by the slip ratio S to find a ratio K according to the following equation (2):

$$K = Tr/S \quad (2)$$

If the transmitted torque Tr is relatively large and the slip ratio S is relatively small, then the coefficient of friction between the wheels and the road is large. If the transmitted torque Tr is relatively small and the slip ratio S is relatively large, the coefficient of friction is small. Therefore, the ratio K can represent a value dependent on the coefficient of friction between the wheels (or their tires) to which the torque Tr is applied and the road.

The magnitude of the ratio K is checked in a step P8. If the ratio K is smaller than a first predetermined value K1, then the oil pressure H is set to C1·S in a step P9. If the ratio K is equal to or larger than the first predetermined value K1 and equal to or smaller than a second predetermined value K2 (K1<K2), then the oil pressure H is set to C2·S in a step P10. If the ratio K is larger than the second predetermined value K2, then the oil pressure is set to C3·S in a step P11. (C1>C2>C3)

According to the illustrated embodiment, expected coefficients of friction between the wheels and the road are roughly divided into three ranges by the predetermined values K1, K2. The reference oil pressure levels (Cn: C1, C2, C3, C1>C2>C3) are assigned to the respective ranges of the coefficients of friction. The hydraulic pressure control circuit 23 is controlled in order to provide the clutch 14 with an oil pressure corresponding to the product Cn·S of the reference oil pressure and the slip ratio S. It is possible to give optimum values to the values K1, K2 and the reference oil pressures Cn by analyzing data obtained by simulation experiments or the like. While expected coefficients of friction between the wheels and the road are divided into three ranges by the predetermined values K1, K2, they can be divided into more ranges by using more predetermined values. It may also be possible to employ one predetermined threshold value to divide expected coefficients of friction into two ranges, so that if the ratio K is smaller than the threshold value, then the coefficient of friction is determined as being low, and if the ratio K is larger than the threshold value, then the coefficient of friction is determined as being high.

Where the ratio K is small (e.g., smaller than the threshold value), i.e., where the coefficient of friction between the wheels and the road is low, the drive force distributed to the front wheels 17F is increased, thus reducing the tractive force that the rear wheels 17R are to exert. Therefore, when the motor vehicle is running a road providing a small coefficient of friction between the wheels and the road, the motor vehicle is prevented from oversteering and is given good maneuverability.

In the above embodiment, the clutch 14 is disposed in the front wheel drive system and controlled dependent on the ratio K. However, a similar clutch may be disposed in the rear wheel drive system, or a differential having a limited-slip differential function may be disposed in the front wheel drive system, and such a clutch or a differential may be controlled so that the drive force transmitted to the rear wheels 17R will be reduced when the coefficient of friction between the wheels and the road.

With the present invention, as described above, the drive force distribution control system for a four-wheel drive motor vehicle detects a drive force applied to wheels and a slip ratio, calculates a ratio between the drive force and the slip ratio, and determines a distribution ratio between drive forces to be distributed to front and rear wheels based on the calculated ratio for reducing the drive force applied to the rear wheels. Therefore, when the motor vehicle runs on a road having a low coefficient of friction, the motor vehicle is prevented from oversteering and is given good maneuverability. The slip ratio can easily be determined by separately detecting the rotational speeds of shafts or the like of the front and rear wheels with rotational speed sensors or the like, and the drive force can also easily be detected by a torque sensor or the like. Accordingly, the drive force distribution control system is simple in arrangement and low in cost. When starting or accelerating the motor vehicle, the drive forces are appropriately distributed to the front and rear wheels for increased propelling performance. When making a turn, the front and rear wheels are allowed to rotate differentially thereby preventing the motor vehicle from suffering the problem of tight-turn braking.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. A drive force distribution control system in a four-wheel drive motor vehicle for distributing drive forces from an engine of the motor vehicle to first and second wheels of the motor vehicle, comprising:
drive force distributing means for distributing and transmitting the drive forces to said first and second wheels;
first speed detecting means for detecting a rotational speed (Nf) of said first wheel;
second speed detecting means for detecting a rotational speed (Nr) of said second wheel;
torque detecting means for detecting a torque (Tr) transmitted to said second wheel; and
control means for calculating a slip ratio (S) of said second wheel to a road on which the motor vehicle is running based on the rotational speeds of said first and second wheels, calculating a ratio (Tr/S) between said torque (Tr) and said slip ratio (S), determining a distribution ratio between the drive forces to be distributed to said first and second wheels based on said ratio between said torque and said slip ratio, and controlling said drive force distributing means to distribute and transmit the drive forces to said first and second wheels according to said distribution ratio.

2. A drive force distribution control system according to claim 1, wherein said first wheel is a front wheel, and said ratio (Tr/S) between the torque and the slip ratio is a value dependent on a coefficient of friction between the wheels and the road, and wherein said control means comprises means for determining said distribution ratio to distribute and transmit a greater drive force to said first wheel if said ratio (Tr/S) is smaller than a threshold value representative of a relatively small coefficient of friction.

3. A drive force distribution control system according to claim 2, wherein said control means comprises means for establishing a first predetermined value (K1) as said threshold value and a second predetermined value (K2) representative of a coefficient of friction greater than said relatively small coefficient of friction, determining whether said ratio (Tr/S) falls in either a first range (Tr/S<K1) smaller than said first predetermined value (K1), or a second range (K1≦Tr/S≦K2) equal to or larger than said first predetermined value (K1) and equal to or smaller than said second predetermined value (K2), or a third range (Tr/S>K2) larger than said second predetermined value (K2), and determining said distribution ratio based on said ratio (Tr/S) such that the drive force distributed and transmitted to said first wheel will be progressively relatively larger as said ratio (Tr/S) falls successively in said first through third ranges.

4. A drive force distribution control system according to claim 1, wherein said control means comprises means for controlling said drive force distributing means to equally distribute the drive forces to said first and second wheels when the motor vehicle is started.

5. A drive force distribution control system according to claim 1, further including braking detecting means for detecting a braked condition of the motor vehicle, and wherein said control means comprises means for controlling said drive force distributing means to at least reduce relative torque transmission between said first and second wheels when the braked condition of the motor vehicle is detected by said braking detecting means.

6. A drive force distribution control system according to claim 1, wherein said control means comprises means for calculating said slip ratio (S) according to the equation:

$$S = 2(Nr - Nf)/(Nr + Nf).$$

7. A drive force distribution control system according to claim 6, wherein said control means comprises means for determining said distribution ratio to transmit all the drive forces to said second wheel.

8. A drive force distribution control system according to claim 6, wherein said control means comprises means for determining said distribution ratio to equally distribute the drive forces to said first and second wheels when said slip ratio (S) is zero (S=0).

9. A drive force distribution control system according to claim 6, wherein said control means comprises means for determining said distribution ratio based on the calculated ratio (Tr/S) between said torque (Tr) and said slip ratio (S) only when said slip ratio (S) is positive.

10. A drive force distribution control system according to claim 9, wherein said first wheel is a front wheel, and said ratio (Tr/S) between the torque and the slip ratio is a value dependent on a coefficient of friction between the wheels and the road, and wherein said control means comprises means for determining said distribution ratio to distribute and transmit a greater drive force to said first wheel if said ratio (Tr/S) is smaller than a threshold value representative of a relatively small coefficient of friction.

11. A drive force distribution control system according to claim 10, wherein said control means comprises means for establishing a first predetermined value (K1) as said threshold value and a second predetermined value (K2) representative of a coefficient of friction greater than said relatively small coefficient of friction, determining whether said ratio (Tr/S) falls in either a first range (Tr/S<K1) smaller than said first predetermined value (K1), or a second range (K1≦Tr/S≦K2) equal to or larger than said first predetermined value (K1) and equal to or smaller than said second predetermined value (K2), or a third range (Tr/S>K2) larger than said second predetermined value (K2), and determining said distribution ratio based on said ratio (Tr/S) such that the drive force distributed and transmitted to said first wheel will be progressively relatively larger as said ratio (Tr/S) falls successively in said first through third ranges.

12. A drive force distribution control system according to claim 6, wherein said control means comprises means for controlling said drive force distributing means to equally distribute the drive forces to said first and second wheels when the motor vehicle is started.

13. A drive force distribution control system according to claim 6, further including braking detecting means for detecting a braked condition of the motor vehicle, and wherein said control means comprises means for controlling said drive force distributing means to at least reduce relative torque transmission between said first and second wheels when the braked condition of the motor vehicle is detected by said braking detecting means.

14. A drive force distribution control system according to claim 12, further including braking detecting means for detecting a parked condition of the motor vehicle, and wherein said control means comprises means for calculating said slip ratio (S) according to said equation when the braked condition is not detected by said braking detecting means.

15. A drive force distribution control system according to claim 11, wherein said drive force distributing means includes a hydraulic clutch for distributing the drive force to said first wheel based on said distribution ratio dependent on a change in oil pressure applied to said hydraulic clutch, and wherein said control means includes means for establishing reference oil pressures (Cn: C1, C2, C3, C1>C2>C3) corresponding respectively to said three ranges, and controlling said hydraulic clutch under an oil pressure corresponding to the product (S·Cn) of said slip ratio (S) and one of said reference oil pressure (Cn).

* * * * *